United States Patent
Hu et al.

(10) Patent No.: US 8,923,019 B2
(45) Date of Patent: Dec. 30, 2014

(54) DC/DC CONVERTER, POWER CONVERTER AND CONTROL METHOD THEREOF

(75) Inventors: Pei-Qing Hu, Shanghai (CN); Hong-Yuan Jin, Shanghai (CN); Hong-Jian Gan, Shanghai (CN); Jian-Ping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 236 days.

(21) Appl. No.: 13/427,386

(22) Filed: Mar. 22, 2012

(65) Prior Publication Data
US 2012/0250356 A1  Oct. 4, 2012

Related U.S. Application Data (60) Provisional application No. 61/468,215, filed on Mar. 28, 2011.

(51) Int. Cl.
*H02M 3/335* (2006.01)
*H02M 1/00* (2006.01)

(52) U.S. Cl.
CPC .. *H02M 3/33569* (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)
USPC .......................................... 363/21.02; 363/16

(58) Field of Classification Search
CPC ............. H02M 2001/0032; H02M 2001/0035; H02M 3/335
USPC ........................................ 363/16, 17, 21.02
See application file for complete search history.

(56) References Cited

U.S. PATENT DOCUMENTS

| | | | |
|---|---|---|---|
| 5,684,678 A | 11/1997 | Barrett | |
| 2001/0053084 A1 | 12/2001 | Navas Sabater et al. | |
| 2007/0297198 A1* | 12/2007 | Chang | 363/17 |
| 2008/0130322 A1* | 6/2008 | Artusi et al. | 363/21.01 |
| 2010/0202170 A1* | 8/2010 | Kim et al. | 363/74 |

FOREIGN PATENT DOCUMENTS

| | | |
|---|---|---|
| CN | 1855680 A | 11/2006 |
| CN | 202026241 U | 11/2011 |
| EP | 0 016 538 A1 | 10/1980 |
| TW | M396538 U1 | 1/2011 |

OTHER PUBLICATIONS

NCP1396A, NCP1396B, High Performance Resonant Mode Controller featuring High-Voltage Drivers, ON Semiconductor, Nov. 2010—Rev. 7, http://onsemi.com.

* cited by examiner

*Primary Examiner* — Timothy J Dole
*Assistant Examiner* — Matthew Grubb
(74) *Attorney, Agent, or Firm* — CKC & Partners Co., Ltd.

(57) ABSTRACT

A DC/DC converter, a power converter and a control method thereof are disclosed, wherein the DC/DC converter includes an output circuit, a rectangular wave generator, a resonant tank, a detection unit and a control unit. The output circuit has a load. The rectangular wave generator converts an input voltage into driving pulses. The resonant tank provides a first voltage based on the driving pulses for the output circuit. The detection unit detects a signal related to a state of the load. When the state of the load is a light-load or a no-load, the control unit controls the rectangular wave generator in a hiccup mode to reduce a ratio of a work period to a stop period, or makes that number of the driving pulses within the current work period is less than the number of the driving pulses when a duty ratio is 50%.

39 Claims, 8 Drawing Sheets

(Prior Art)

Fig. 1

(Prior Art)

Fig. 2

(Prior Art)

Fig. 3

(Prior Art)

DC/DC CONVERTER, POWER CONVERTER AND CONTROL METHOD THEREOF

CROSS-REFERENCE TO RELATED APPLICATION

This application claims the priority benefit of U.S. Provisional Application Ser. No. 61/468,215, filed Mar. 28, 2011, which is herein incorporated by reference.

BACKGROUND

1. Technical Field

The present disclosure relates to power electronic, and more particularly, a power converter and a control method thereof.

2. Description of Related Art

In recent years, with the fast development of the energy conservation technology, more and more customers desire that a switching-mode converter can achieve high conversion efficiency in a wide load range, so improving the efficiency of this converter in a light-load or a no-load is also very important. In this regard, the International Energy Agency (IEA), the United States and Europe and other countries and organizations have been established or are establishing standards to limit a loss of the switching-mode converter in the light-load or the no-load.

Figure 1:
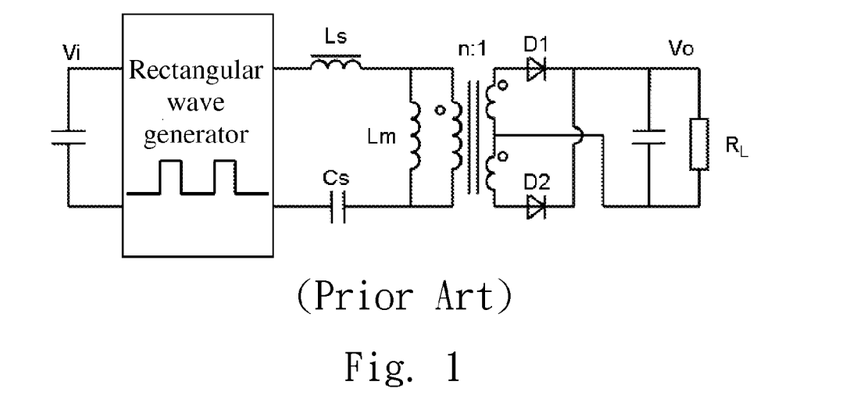
FIG. 1 is a block diagram of a LLC series resonant DC/DC converter.
Figure 2:
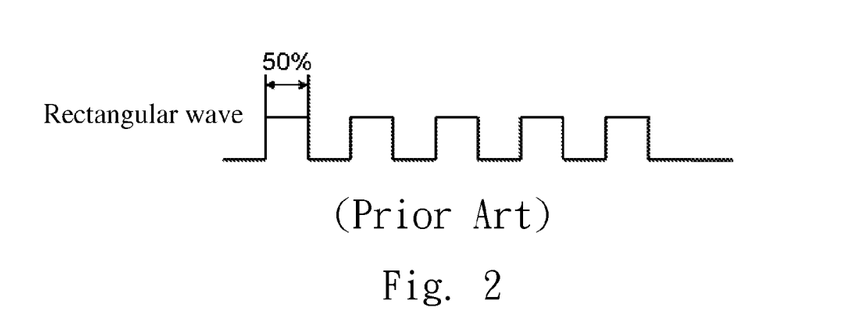
FIG. 2 is a conventional driving waveform of a rectangular wave generator of FIG. 1.

By using resonant converter technology, a series resonant DC/DC converter achieve zero voltage switching, and therefore power loss is very small, and power converter efficiency in full-load is high. FIG. 1 is a block diagram of a LLC series resonant DC/DC converter. This topology is commonly based on a frequency modulation mode to stabilize the output voltage by changing the working frequency of rectangular waves, in which the duty ratio is 50%, as shown in FIG. 2. The relationship between the power output-voltage gain M and a working frequency is:

$$M = \frac{2n*V_o}{V_{in}} = \frac{1}{\sqrt{\left\{1+\frac{L_s}{L_m}\left[1-\left(\frac{f_s}{f}\right)^2\right]\right\}^2 + Q^2\left(\frac{f}{f_s}-\frac{f_s}{f}\right)^2}},$$

wherein the resonance frequency $$f_s = \frac{1}{2\pi\sqrt{C_s*L_s}}, Q = \frac{2\pi f_s L_s}{\frac{8}{\pi^2}n^2 R_L},$$

wherein $L_s$ is a resonant inductance value, $L_m$ is a magnetizing inductance value, $C_s$ is a resonant capacitance value, f is the working frequency of the rectangular wave, n is a turns ratio of a transformer, and $R_L$ is a resistance value of the output load.

Figure 3:
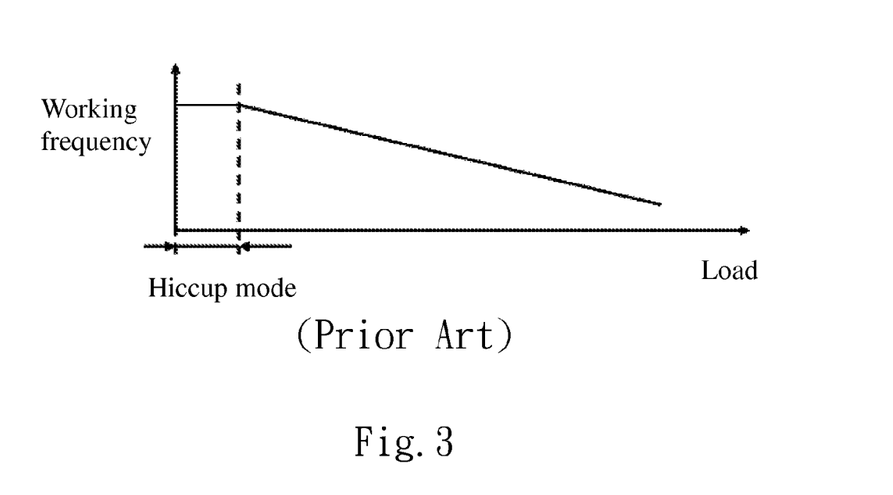
FIG. 3 illustrates a conventional method of controlling the LLC series resonant DC/DC converter of FIG. 1.

As shown in FIG. 3, the working method in the light-load is as follows: detecting a state of the load, and controlling the series resonant converter to increase the working frequency of the rectangular wave as the load is decreased, when the working frequency achieves a predetermined value, the working frequency is maintained at this value, and this converter operates in an intermittent control mode (i.e., a hiccup mode).

Existing method for improving the efficiency in the light-load is as follows:

1. Reducing the working frequency of the converter. Because switching losses and driver losses in power devices account for a large proportion of losses in light-load, so reducing the switching frequency can effectively reduce these losses, thus reducing the light load losses, which applies to PWM (Pulse Width Modulation) circuit.
2. Controlling the converter to operate in an intermittent control mode. By detecting a voltage error amplifier signal, the converter which is in the light-load works in a intermittent mode, so as to reduce the on-off times of the converter switch per unit time, and thereby reducing standby losses.

Figure 4:
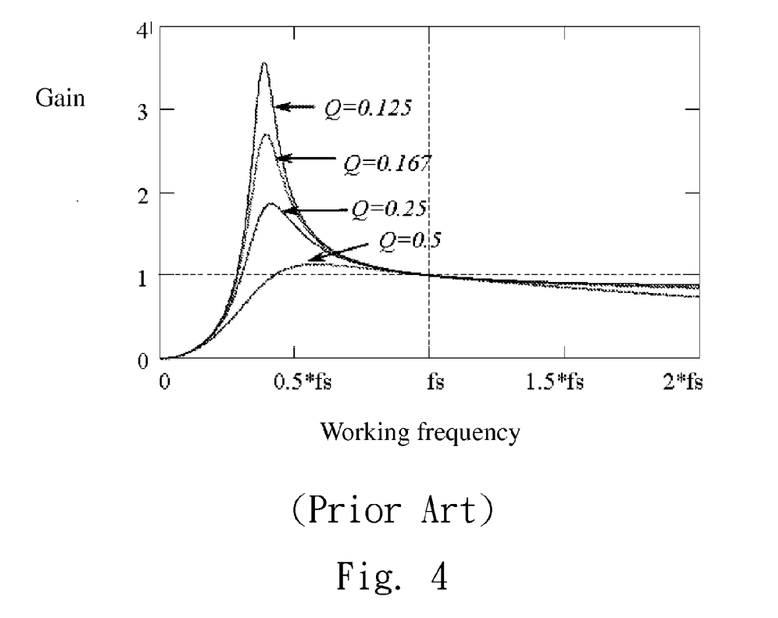
FIG. 4 shows a gain curve of the LLC series resonant DC/DC converter according to the conventional method.

In the resonant circuit, only reducing the operating frequency cannot effectively control the output voltage, and therefore the above first method cannot be implemented. Above second method may improve the efficiency in the light-load to a certain extent, but when the operating frequency of the converter is higher, the gain is less than 1, as shown in FIG. 4. Therefore, in each work cycle, transmission energy is lower; thus the on-off times of the converter switch is still too much, and excessive switching loss and driving loss per unit time are also higher. Thus, the second method cannot reach the limit standard for the light-load loss.

In view of the foregoing, there is an urgent need in the related field to provide a way to improve the efficiency in the light-load more efficiently.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a power converter and a method of controlling the power converter to meet the requirements for high efficiency in the light-load.

According to one embodiment of the present invention, a DC/DC converter includes an output circuit, a rectangular wave generator, a resonant tank, a detection unit and a control unit. The output circuit has a load. The rectangular wave generator converts an input voltage into driving pulses. The resonant tank provides a first voltage based on the driving pulses for the output circuit. The detection unit detects a signal related to a state of the load. When the state of the load is a light-load or a no-load, the control unit controls the rectangular wave generator in a hiccup mode to reduce a ratio of a current work period to a stop period.

When the state of the load is the light-load or the no-load, the control unit controls the rectangular wave generator in a hiccup mode, so that the number of the driving pulses within the current work period is less than the number of the driving pulses when a duty ratio is 50%.

When the state of the load is the light-load or the no-load, the control unit changes the duty ratio of the driving pulses during the current work period, and then during the stop period the control unit calculates the number of the driving pulses within the current work period and adjusts the duty ratio of the driving pulses according to the number of the driving pulses.

When the state of the load is the light-load or the no-load, the control unit decreases the duty ratio of the driving pulses during the current work period; when during the stop period the control unit determines that the number of the driving pulses within the current work period is less than or equal to the number of the driving pulses within a previous work period, the control unit keeps on decreasing the duty ratio of the driving pulses during a following work period.

When the state of the load is the light-load or the no-load, the control unit decreases the duty ratio of the driving pulses during the current work period; when during the stop period the control unit determines that the number of the driving pulses within the current work period is more than the number of the driving pulses within a previous work period, the control unit increases the duty ratio of the driving pulses during a following work period.

After increasing the duty ratio of the driving pulses, when the control unit determines that the number of the driving pulses within the following work period is less than or equal to the number of the driving pulses within the current work period, the control unit keeps on increasing the duty ratio of the driving pulses during a yet following work period.

After increasing the duty ratio of the driving pulses, when the control unit determines that the number of the driving pulses within the following work period is more than the number of the driving pulses within the current work period, the control unit decreases the duty ratio of the driving pulses during a yet following work period.

When the state of the load is the light-load or the no-load, the control unit increases the duty ratio of the driving pulses during the current work period; when during the stop period the control unit determines that the number of the driving pulses within the current work period is less than or equal to the number of the driving pulses within a previous work period, the control unit keeps on increasing the duty ratio of the driving pulses during a following work period.

When the state of the load is the light-load or the no-load, the control unit increases the duty ratio of the driving pulses during the current work period; when during the stop period the control unit determines that the number of the driving pulses within the current work period is more than the number of the driving pulses within a previous work period, the control unit decreases the duty ratio of the driving pulses during a following work period.

After decreasing the duty ratio of the driving pulses, when the control unit determines that the number of the driving pulses within the following work period is less than or equal to the number of the driving pulses within the current work period, the control unit keeps on decreasing the duty ratio of the driving pulses during a yet following work period.

After decreasing the duty ratio of the driving pulses, when the control unit determines that the number of the driving pulses within the following work period is more than the number of the driving pulses within the current work period, the control unit increases the duty ratio of the driving pulses during a yet following work period.

When the state of the load is a heavy-load or a full-load, the control unit controls the rectangular wave generator in a frequency modulation mode.

The rectangular wave generator includes a switch, and the control unit controls an on/off state of the switch to output the driving pulses, wherein amplitude of the driving pulses is equal to the input voltage or the double of the input voltage.

The switch is a half-bridge circuit or a full-bridge circuit.

The load includes a resistor.

The output circuit further includes a transformer and a rectifier both electrically connected to the resistor.

A working frequency of the driving pulses is higher than a resonance frequency of the resonant tank, and the duty ratio of the driving pulses is within a predetermined range, so that a voltage gain of the DC/DC converter is greater than another voltage gain under the condition of 50% duty ratio.

The resonant tank is a serial resonant circuit or a parallel resonant circuit.

The serial resonant circuit is a LC series resonant circuit or a LLC series resonant circuit.

The LLC series resonant circuit includes a magnetizing inductor, a resonant inductor and a resonant capacitor connected to each other in series, wherein the magnetizing inductor and the output circuit are connected in parallel.

The duty ratio is less than 0.5 and greater than a lower limit value of the predetermined range, so that when the resonant capacitor charges, the voltage gain of the DC/DC converter is greater than said another voltage gain under the condition of 50% duty ratio.

Alternatively, the duty ratio is greater than 0.5 and less than an upper limit value of the predetermined range, so that when the resonant capacitor discharges, the voltage gain of the DC/DC converter is greater than said another voltage gain under the condition of 50% duty ratio.

According to another embodiment of the present invention, a power converter includes above DC/DC converter, a power factor correction device and an electromagnetic interference filter. The power factor correction device is electrically coupled with the DC/DC converter. The electromagnetic interference filter is electrically coupled with the power factor correction device for receiving alternating current, where the electromagnetic interference filter and the power factor correction device convert the alternating current into the input voltage and provide the input voltage for the DC/DC converter.

When the state of the load is the light-load or the no-load, the power factor correction device reduces the input voltage provided for the DC/DC converter.

When the state of the load is the light-load or the no-load, the power factor correction device is turned off.

The power factor correction device includes a bridge rectifier and a power factor corrector. The power factor corrector is electrically coupled with the bridge rectifier.

The power factor correction device includes a bridgeless power factor corrector.

According to yet another embodiment of the present invention, a method of controlling the power converter, the method includes following steps: (a) converting an input voltage into driving pulses; (b) providing a first voltage based on the driving pulses for an output circuit; (c) detecting a signal related to a state of the load; and (d) when the state of the load is a light-load or a no-load, controlling the driving pulses in a hiccup mode, thus reducing a ratio of a current work period to a stop period.

In step (d), when the state of the load is the light-load or the no-load, the driving pulses in the hiccup mode are controlled so that the number of the driving pulses within the current work period is less than the number of the driving pulses when a duty ratio is 50%.

In step (d), when the state of the load is the light-load or the no-load, the duty ratio of the driving pulses is changed during the current work period; then, during the stop period, the number of the driving pulses within the current work period is calculated, and the duty ratio of the driving pulses is adjusted according to the number of the driving pulses.

In step (d), when the state of the load is the light-load or the no-load, the duty ratio of the driving pulses is decreased during the current work period; when during the stop period it is determined that the number of the driving pulses within the current work period is less than or equal to the number of the driving pulses within a previous work period, the duty ratio of the driving pulses is still decreased during a following work period.

In step (d), when the state of the load is the light-load or the no-load, the duty ratio of the driving pulses is decreased during the current work period; when during the stop period it is determined that the number of the driving pulses within the current work period is more than the number of the driving pulses within a previous work period, the duty ratio of the driving pulses is increased during a following work period.

In step (d), after the duty ratio of the driving pulses is increased, the control unit determines that the number of the driving pulses within the following work period is less than or equal to the number of the driving pulses within the current work period, the duty ratio of the driving pulses is still increased during a yet following work period.

In step (d), after the duty ratio of the driving pulses is increased, when it is determined that the number of the driving pulses within the following work period is more than the number of the driving pulses within the current work period, the duty ratio of the driving pulses is decreased during a yet following work period.

In step (d), when the state of the load is the light-load or the no-load, the duty ratio of the driving pulses is increased during the current work period; when during the stop period it is determined that the number of the driving pulses within the current work period is less than or equal to the number of the driving pulses within a previous work period, the duty ratio of the driving pulses is still increased during a following work period.

In step (d), when the state of the load is the light-load or the no-load, the duty ratio of the driving pulses is increased during the current work period; when during the stop period it is determined that the number of the driving pulses within the current work period is more than the number of the driving pulses within a previous work period, the duty ratio of the driving pulses is decreased during a following work period.

In step (d), after the duty ratio of the driving pulses is decreased, when it is determined that the number of the driving pulses within the following work period is less than or equal to the number of the driving pulses within the current work period, the duty ratio of the driving pulses is still decreased during a yet following work period.

In step (d), after the duty ratio of the driving pulses is decreased, when it is determined that the number of the driving pulses within the following work period is more than the number of the driving pulses within the current work period, the duty ratio of the driving pulses is increased during a yet following work period.

When the state of the load is the heavy-load or the full-load, the control unit controls the rectangular wave generator in a frequency modulation mode.

In step (a), an on/off state of a switch is controlled to output the driving pulses, where amplitude of the driving pulses is equal to the input voltage or the double of the input voltage.

The method further includes a step of configuring an electromagnetic interference filter to receive alternating current, wherein the electromagnetic interference filter and a power factor correction device convert the alternating current into the input voltage and provides the input voltage.

When the state of the load is the light-load or the no-load, the input voltage provided from the power factor correction device is reduced.

When the state of the load is the light-load or the no-load, the power factor correction device is turned off.

Technical advantages are generally achieved, by embodiments of the present invention, as follows: in view of the above, the ratio of the work period to the stop period is reduced and/or the number of the driving pulses within the work period is less than the number of the driving pulses when the duty ratio is 50%, so that the time ratio of a period of transmitting energy to another period of stopping transmitting energy can be reduced for improving the efficiency in the light-load.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 5:
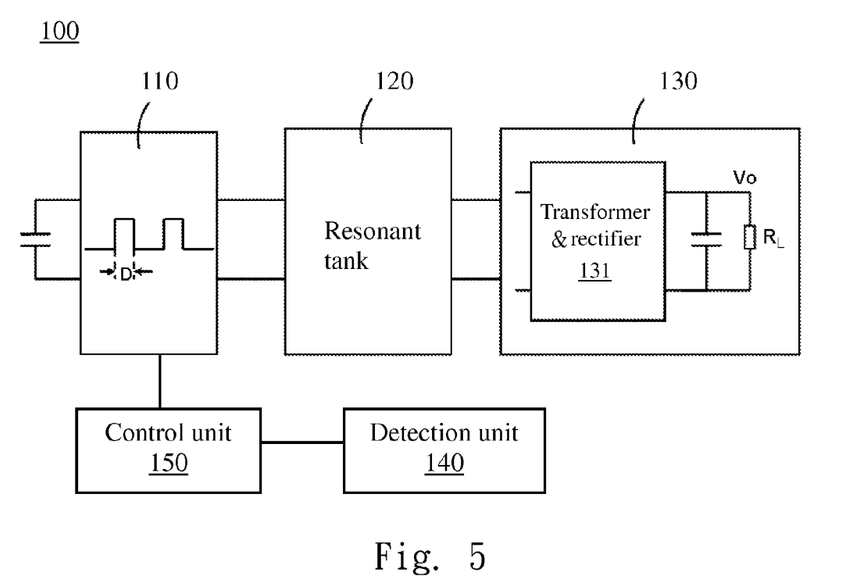
FIG. 5 is a block diagram of a DC/DC converter according to one embodiment of the present disclosure.

In one or more various aspects, the present invention is directed to meet the requirements for high efficiency in the light-load. Referring to FIG. 5, illustrated is a block diagram of a DC/DC converter 100 according to one embodiment of the present disclosure. This converter may be easily inserted into a power converter, and may be applicable or readily adaptable to all related technology.

The DC/DC converter 100 includes a rectangular wave generator 110, a resonant tank 120, an output circuit 130, a detection unit 140 and a control unit 150. The rectangular wave generator 110 is electrically coupled with the resonant tank 120. The resonant tank 120 is electrically coupled with the output circuit 130. The output circuit 130 is electrically coupled with the detection unit 140. The detection unit 140 is electrically coupled with the control unit 150. The control unit 150 is electrically coupled with the rectangular wave generator 110.

Figure 6:
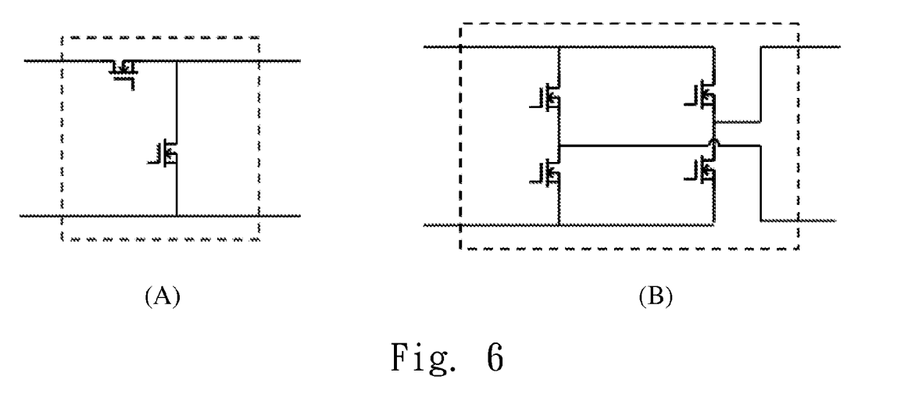
FIG. 6 is a circuit diagram of a rectangular wave generator according to one embodiment of the present disclosure.

The rectangular wave generator 110 includes one or more switches, such as half-bridge circuit (A) or a full-bridge circuit (B) in FIG. 6. The control unit 150 controls an on/off state of the switch to output the rectangular wave, wherein amplitude of the rectangular wave is equal to the input voltage, wherein D represents the duty ratio of the rectangular wave, and f represents the frequency of the rectangular wave. Alternatively, in another embodiment, the amplitude of the rectangular wave is the double of the input voltage. Those with ordinary skill in the art may set the amplitude of the rectangular wave depending on the desired application.

Figure 7:
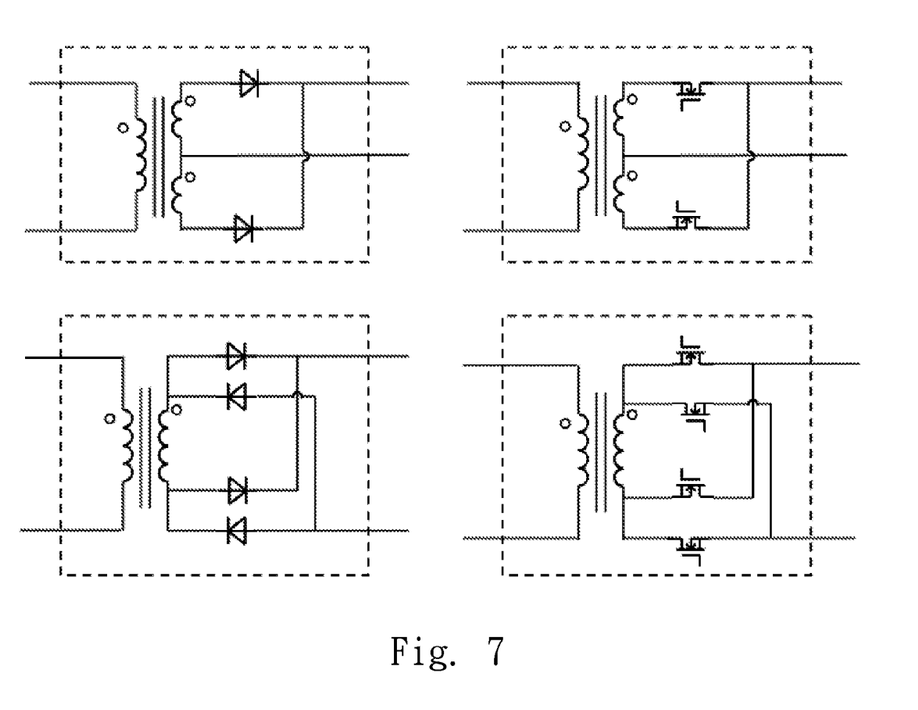
FIG. 7 is a circuit diagram of a transformer and a rectifier according to one embodiment of the present disclosure.

The output circuit 130 has a load $R_L$, such as a resistor. Alternatively, the output circuit 130 includes a transformer with a rectifier 131, and the load $R_L$, wherein the transformer and the rectifier 131 both electrically connected to the resistor. The rectifier may be a full-wave rectifier, a center-tapped rectifier, a diode rectifier, a synchronous rectifier, or the combination thereof, as shown in FIG. 7.

The resonant tank 120 may be a serial resonant circuit, such as a LC series resonant circuit, a LLC series resonant circuit or the like, or a parallel resonant circuit. The output circuit 130 and one or more resonant devices of the resonant tank 120 are connected in parallel or series.

The control unit 150 may be hardware, software, and/or firmware. For example, if speed and accuracy are specific concerns, the control unit 150 may opt for a mainly hardware and/or firmware; alternatively, if flexibility is specific concerns, the control unit 150 may opt for a mainly software implementation; or, yet again alternatively, the control unit 150 may opt for some combination of hardware, software, and/or firmware. Hence, there are several possible implementation way by which the processes and/or devices and/or other technologies described herein may be effected, none of which is inherently superior to the other in that any implementation way to be utilized is a choice dependent upon the context in which the implementation way will be deployed and the specific concerns (e.g., speed, flexibility, or predictability), any of which may vary.

Figure 12:
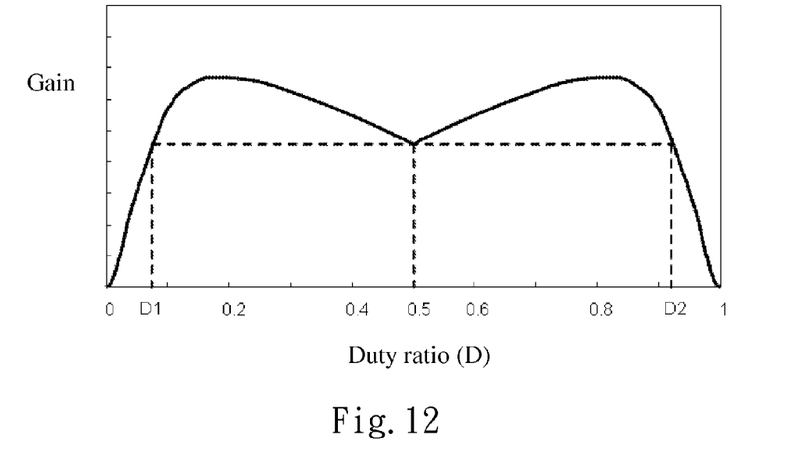
FIG. 12 shows a gain curve of the LLC series resonant circuit according to one embodiment of the present disclosure.

When the DC/DC converter 100 operates, the rectangular wave generator 110 converts an input voltage into driving pulses. The resonant tank 120 provides a first voltage based on the driving pulses for the output circuit 130. The detection unit 140 detects a signal related to a state of the load $R_L$; for example, this signal related to the load current detected by the detection unit 140 may be a current signal of the primary side of the transformer, a current signal of the secondary side of the transformer, a current signal through the resonant inductor $L_s$ of the resonant tank 120, a voltage of the resonant capacitor $C_s$ or the like. When the state of the load is a light-load or a no-load, the control unit 150 controls the rectangular wave generator 110 in a hiccup mode, so that the working frequency of the rectangular wave is higher than a resonance frequency of the resonant tank 120, and the duty ratio of the rectangular wave is within a predetermined range (i.e., 0.5>D>the lower limit value D1 or 0.5<D<the upper limit value D2), in which a voltage gain of the DC/DC converter 100 is greater than another voltage gain under the condition of 50% duty ratio, as shown in FIG. 12.

Furthermore, when the state of the load is the heavy-load or the full-load, the control unit 150 controls the rectangular wave generator 110 in a frequency modulation mode. In the frequency modulation mode, the output voltage is stabilized by changing the frequency of rectangular waves, so as to meet the requirements for high efficiency in the heavy-load.

The primary control method of the present invention is to change the duty ratio D of the driving pulses of the rectangular wave generator 110 when the state of circuitry is the light-load, so as to increase the loop gain.

This high-gain control method can improve the efficiency of the converter. When the circuitry works in the high-gain and in the intermittent working mode (i.e., hiccup mode), the time ratio of a period of transmitting energy to another period of stopping transmitting energy can be efficiently reduced in the DC/DC converter 100. Thus, the work period of the converter 100 per unit time is reduced for improving the efficiency in the light-load.

Figure 8:
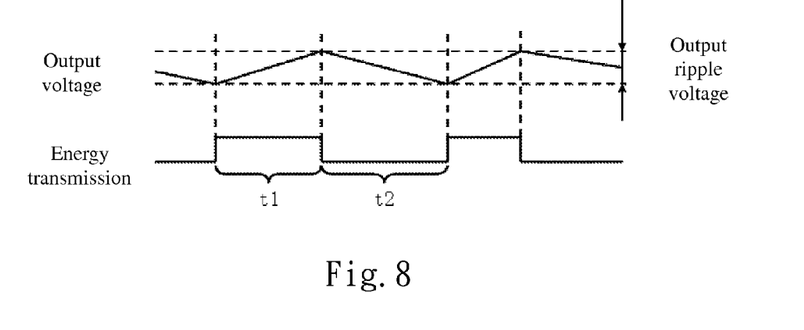
FIG. 8 illustrates an intermittent control mode according to one embodiment of the present disclosure.

Referring to FIG. 8, illustrated is a constant output ripple voltage according to one embodiment of the present disclosure, in which t1 is a work period of the converter 100 during which energy can be transmitted, and t2 is a stop period of the converter 100 during which energy cannot be transmitted. Due to increase on gain, t1 is reduced whenever energy transmission and t2 is constant. Thus, the work period of the converter 100 is reduced, thereby improving the efficiency in the light-load.

In another embodiment, t1 may be constant, and due to increase on gain, t2 is increased for stabilize the output. Thus, the work period of the converter 100 is reduced for improving the efficiency in the light-load. Alternatively, t1 and t2 may be changeable; however, t1/t2 is reduced for improving the efficiency in the light-load.

Figure 9:
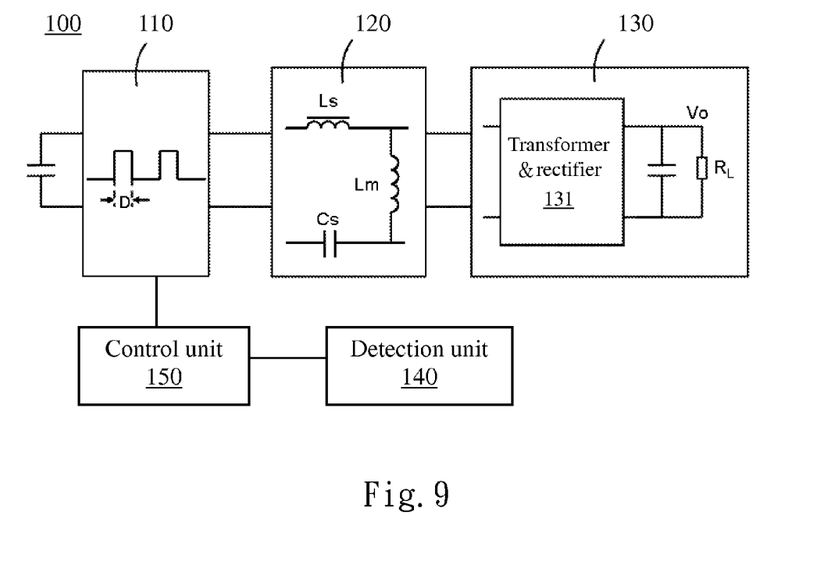
FIG. 9 shows circuit blocks of a LLC series resonant circuit according to one embodiment of the present disclosure.

Referring to FIG. 9, illustrated is circuit blocks of a LLC series resonant circuit according to one embodiment of the present disclosure, in which a magnetizing inductor $L_m$, a resonant inductor $L_s$ and a resonant capacitor $C_s$ are connected to each other in series, where the magnetizing inductor $L_m$ and the output circuit 130 are connected in parallel.

When the circuitry works in the light-load, the working frequency of the circuitry, i.e., the frequency f of the rectangular wave generated by the rectangular wave generator 110, is higher than resonant frequency $f_s$ of a serial resonator composed of $L_s$ and $C_s$. Because the ripple of the voltage of the resonant capacitor $C_s$ is very small, the voltage of the resonant capacitor $C_s$ is approximately equal to the product of the duty ratio and the input voltage, i.e., $D \times V_i$.

When D=0.5, the voltage of the resonant capacitor $C_s$ is $D \times V_i = V_i/2$. The total voltage of the magnetizing inductor $L_m$ and the resonant inductor $L_s$ is $(1-D) \times V_i = V_i/2$.

Figure 10:
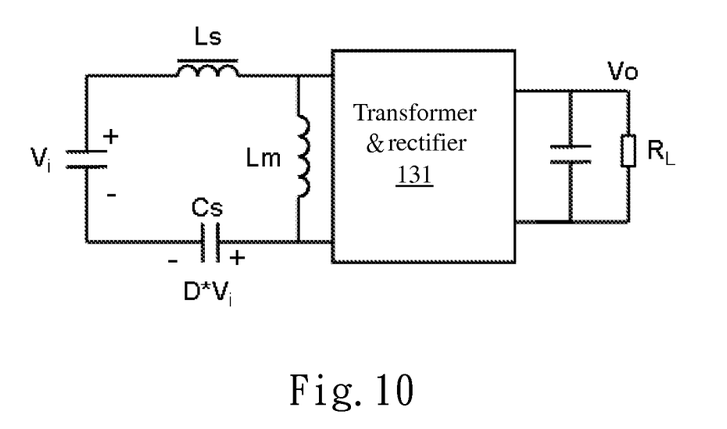
FIG. 10 is an equivalent-circuit diagram of FIG. 9 when a resonant capacitor $C_s$ charges.

When D<0.5, the voltage of the resonant capacitor $C_s$ is $D \times V_i$, and when the resonant capacitor $C_s$ charges, the equivalent-circuit is illustrated in FIG. 10. The total voltage of the magnetizing inductor $L_m$ and the resonant inductor $L_s$ is $(1-D) \times V_i > V_i/2$.

Figure 11:
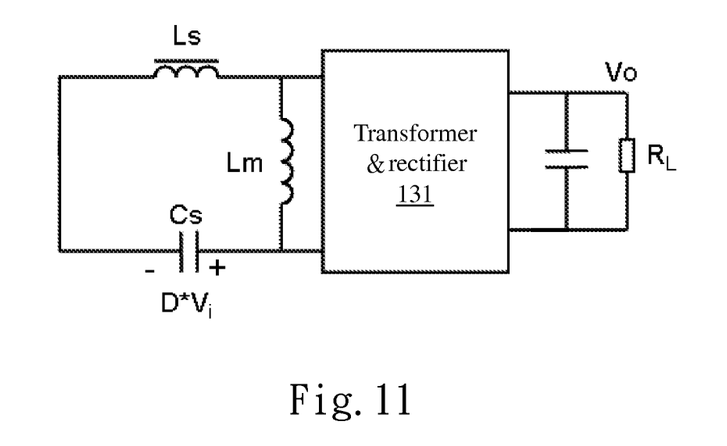
FIG. 11 is an equivalent-circuit diagram of FIG. 9 when the resonant capacitor $C_s$ discharges.

When D>0.5, the voltage of the resonant capacitor $C_s$ is $D \times V_i$, and when the resonant capacitor $C_s$ discharges, the equivalent-circuit is illustrated in FIG. 11. The total voltage of the magnetizing inductor $L_m$ and the resonant inductor $L_s$ is $D \times V_i > V_i/2$.

Since the output circuit 130 and the magnetizing inductor $L_m$ are connected in parallel, the output circuit 130 can obtain higher voltage, i.e., the gain of the circuitry is greater than said another voltage gain under the condition of 50% duty ratio.

FIG. 12 shows a relation curve between the gain and the duty ratio D according to one embodiment of the present disclosure. When the duty ratio D of the rectangular wave is within above predetermined range (i.e., 0.5>D>the lower limit value D1 or 0.5<D<the upper limit value D2), the gain of the circuitry is greater than another voltage gain under the condition of 50% duty ratio. It should be noted that the lower limit value D1 and the upper limit value D2 are not constant values, and depend on the load $R_L$ and resonant parameters.

Referring to FIGS. 10 and 12, the duty ratio D is less than 0.5 and greater than a lower limit value D1 of the predetermined range, so that when the resonant capacitor $C_s$ charges, the voltage gain of the DC/DC converter is greater than said another voltage gain under the condition of 50% duty ratio.

Turning to FIGS. 11 and 12, the duty ratio D is greater than 0.5 and less than an upper limit value D2 of the predetermined range, so that when the resonant capacitor Cs discharges, the voltage gain of the DC/DC converter is greater than said another voltage gain under the condition of 50% duty ratio.

Figure 13:
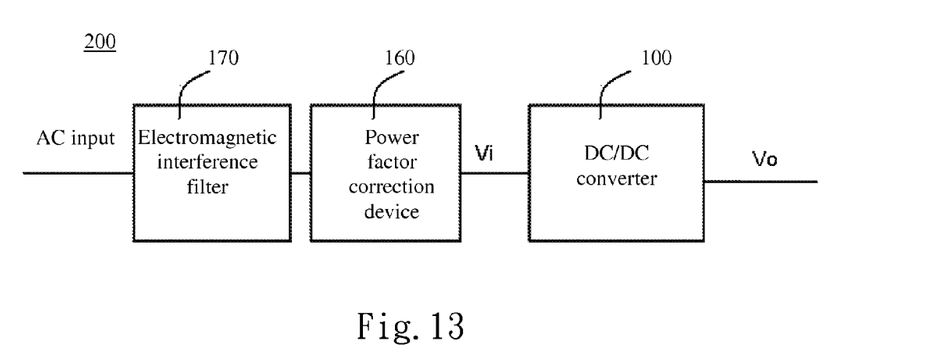
FIG. 13 is a block diagram of a power converter according to one embodiment of the present disclosure.

This high-gain control method can be easily inserted into a switching power source for improving the efficiency in the light-load. Referring to FIG. 13, illustrated is a block diagram of a power converter 200 according to one embodiment of the present disclosure. The power converter 200 includes above DC/DC converter 100, a power factor correction device 160 and an electromagnetic interference filter 170. The power factor correction device 160 is electrically coupled with the DC/DC converter 100. The electromagnetic interference filter 170 is electrically coupled with the power factor correction device 160. In use, electromagnetic interference filter 170 receives alternating current, and the electromagnetic interference filter 170 and the power factor correction device 160 convert the alternating current into the input voltage and provide the input voltage $V_i$ for the DC/DC converter 100.

Figure 14:
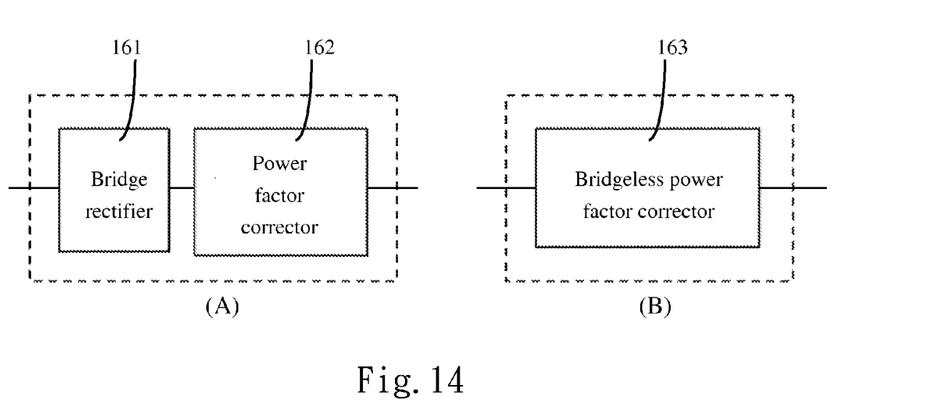
FIG. 14 is a block diagram of a power factor correction device according to one embodiment of the present disclosure.

As shown in FIG. 14, (A) the power factor correction device 160 includes a bridge rectifier 161 and a power factor corrector 162, where the power factor corrector 161 is electrically coupled with the bridge rectifier 162; alternatively, (B) the power factor correction device 160 includes a bridgeless power factor corrector 163.

Figure 15:
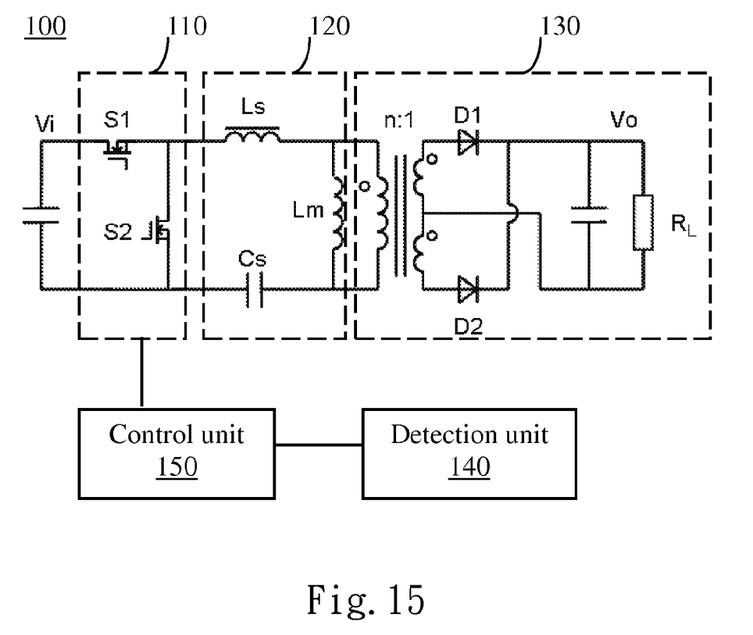
FIG. 15 is a main circuit diagram of a half-bridge LLC series resonant circuit according to one embodiment of the present disclosure.

Referring to FIG. 15, illustrated is a main circuit diagram of a half-bridge LLC series resonant circuit according to one embodiment of the present disclosure. The method of controlling this circuit to operate at high gain is mentioned below.

When the state of the load is a light-load or a no-load, the control unit 150 controls the rectangular wave generator 110 in a hiccup mode to reduce a ratio of a current work period t1 to a stop period t2.

In one embodiment, when the state of the load is the light-load or the no-load, the control unit 150 controls the rectangular wave generator 110 in a hiccup mode, so that the number of the driving pulses within the work period t1 is less than the number of the driving pulses when a duty ratio is 50%.

In one embodiment, when the state of the load is the light-load or the no-load, the control unit 150 controls the rectangular wave generator 110 in a hiccup mode, so that the ratio of a work period t1 to a stop period t2 can be successively reduced.

In one embodiment, when the state of the load is the light-load or the no-load, the control unit 150 changes the duty ratio of the driving pulses during the work period t1; then, during the stop period t2, the control unit 150 calculates the number of the driving pulses within the work period t1 and adjusts the duty ratio of the driving pulses according to the number of the driving pulses.

Figure 16:
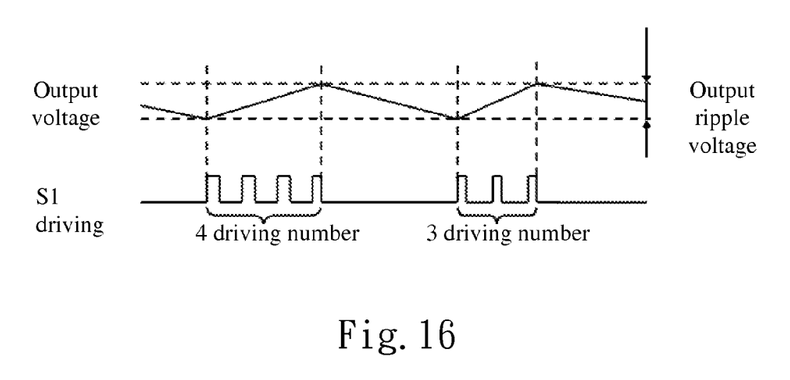
FIG. 16 shows a relationship between driving pulse and output voltage of FIG. 15.

When the state of the load is mitigated, the circuit operates in the intermittent working mode (i.e., hiccup mode), as shown in FIG. 16. When the output voltage is lower than a predetermined value, the driving pulses is outputted. When the output voltage is higher than another predetermined value, the driving pulses aren't outputted.

Figure 17:
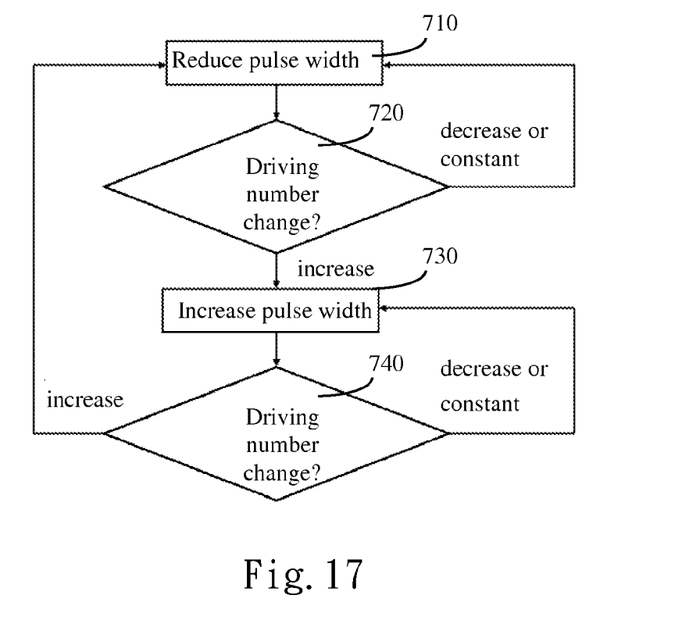
FIG. 17 is a flowchart of controlling a duty ratio (D<0.5) according to one embodiment of the present disclosure.

A workflow is shown in FIG. 17. In the intermittent working mode, the width of the driving pulses is reduced in step 710. Then, the change of the number of the driving pulses is determined in step 720. When the number of the driving pulses is decreased or constant at next time, the width of the driving pulses is reduced further in step 710. On the contrary, when the number of the driving pulses is increased at next time, the width of the driving pulses is increased in step 730. Then, the change of the number of the driving pulses is determined in step 740. This workflow may be repeated in an iterative manner. The less number of the driving pulses is due to the high gain, and therefore the circuit can operate at the high gain by performing the workflow. When the state of the load is the light-load, the duty ratio of the driving pulses of driving the SWITCH S1 is less than 0.5.

Specifically, in steps 710 and 720, when the state of the load is the light-load or the no-load, the control unit 150 decreases the duty ratio of the driving pulses during a current work period; when during the stop period the control unit 150 determines that the number of the driving pulses within the current work period is less than or equal to the number of the driving pulses within a previous work period, in steps 710 the control unit 150 keeps on decreasing the duty ratio of the driving pulses during a following work period.

On the other hand, in steps 710 and 720, when the state of the load is the light-load or the no-load, the control unit 150 decreases the duty ratio of the driving pulses during the current work period; when during the stop period the control unit 150 determines that the number of the driving pulses within the current work period is more than the number of the driving pulses within a previous work period, in steps 730 the control unit 150 increases the duty ratio of the driving pulses during a following work period.

After increasing the duty ratio of the driving pulses, in steps 740, when the control unit 150 determines that the number of the driving pulses within the following work period is less than or equal to the number of the driving pulses within the current work period, in steps 730, the control unit 150 keeps on increasing the duty ratio of the driving pulses during a yet following work period.

On the other hand, after increasing the duty ratio of the driving pulses in steps 740, when the control unit 150 determines that the number of the driving pulses within the following work period is more than the number of the driving pulses within the current work period, in steps 710, the control unit 150 decreases the duty ratio of the driving pulses during a yet following work period.

Figure 18:
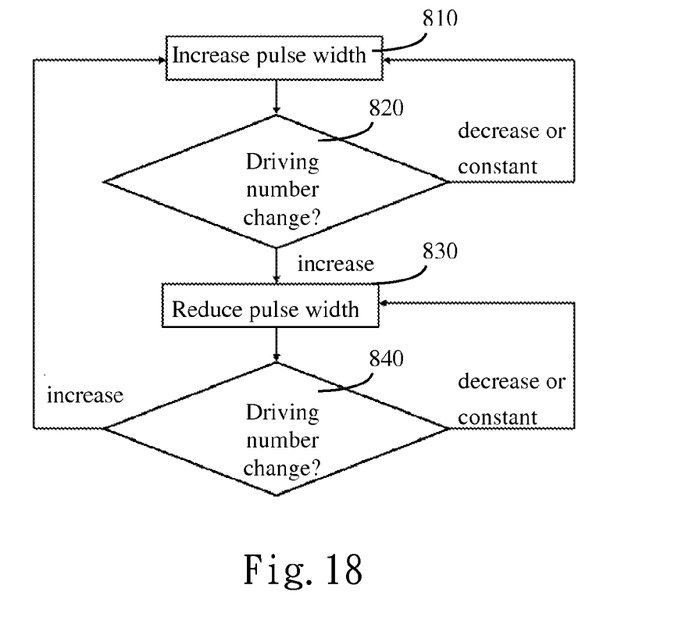
FIG. 18 is a flowchart of controlling a duty ratio (D>0.5) according to another embodiment of the present disclosure.

Alternatively, another workflow is shown in FIG. 18. In the intermittent working mode, the width of the driving pulses of driving the SWITCH S1 is increased in step 810. Then, the change of the number of the driving pulses is determined in step 820. When the number of the driving pulses is decreased or constant at next time, the width of the driving pulses is still increased. On the contrary, when the number of the driving pulses is increased at next time, the width of the driving pulses is reduced in step 830. Then, the change of the number of the driving pulses is determined in step 840. This workflow may be repeated in an iterative manner. The less number of the driving pulses is due to the high gain, and therefore the circuit can operate at the high gain by performing the workflow. When the state of the load is the light-load, the duty ratio of the driving pulses of driving the SWITCH S1 is greater than 0.5.

Specifically, in steps 810 and 820, when the state of the load is the light-load or the no-load, the control unit 150 increases the duty ratio of the driving pulses during the current work period; when during the stop period the control unit 150 determines that the number of the driving pulses within the current work period is less than or equal to the number of the driving pulses within a previous work period, in step 810, the control unit 150 keeps on increasing the duty ratio of the driving pulses during a following work period.

On the other hand, in steps 810 and 820, when the state of the load is the light-load or the no-load, the control unit 150 increases the duty ratio of the driving pulses during the current work period; when during the stop period the control unit 150 determines that the number of the driving pulses within the current work period is more than the number of the driving pulses within a previous work period, in step 830, the control unit 150 decreases the duty ratio of the driving pulses during a following work period.

After decreasing the duty ratio of the driving pulses, in step 840, when the control unit 150 determines that the number of the driving pulses within the following work period is less than or equal to the number of the driving pulses within the current work period, in step 830, the control unit 150 keeps on decreasing the duty ratio of the driving pulses during a yet following work period.

On the other hand, after decreasing the duty ratio of the driving pulses, in steps 840, when the control unit 150 determines that the number of the driving pulses within the following work period is more than the number of the driving pulses within the current work period, in step 810, the control unit 150 increases the duty ratio of the driving pulses during a yet following work period.

The control strategy 1: when the state of the load is the heavy-load, the converter works in a frequency modulation mode (i.e., PFM mode) to meet the requirements for high efficiency in the heavy-load. When the state of the load is the light-load, the converter works in a high-gain mode and utilizes the intermittent working mode (i.e., hiccup mode) to stabilize the output voltage, and thereby improving the efficiency in the light-load.

The control strategy 2: when the state of the load is the heavy-load, the converter works in the frequency modulation mode (i.e., PFM mode) to meet the requirements for high efficiency in the heavy-load. When the state of the load is the light-load, the converter works in the high-gain mode, utilizes the intermittent working mode to stabilize the output voltage, and meanwhile reduce the output voltage of the power factor correction device 160; for example, the control unit 150 decreases the output voltage of the power factor correction device 160 for increasing the efficiency of the power factor correction device 160, and thereby improving the efficiency in the light-load. Furthermore, the efficiency of both of the power factor correction device 160 and the DC/DC converter 100 can be increased, so as to increase the efficiency in the light-load.

The control strategy 3: when the state of the load is the heavy-load, the converter works in the frequency modulation mode (i.e., PFM mode) to meet the requirements for high efficiency in the heavy-load. When the state of the load is the light-load, the converter works in the high-gain mode, utilizes the intermittent working mode to stabilize the output voltage, and meanwhile turns off the power factor correction device 160 when the input alternating current voltage is high; for example, the control unit 150 turns off the power factor correction device 160. When input alternating current voltage is low, the output voltage of the power factor correction device 160 is decreased for increasing the efficiency of the power factor correction device 160, and thereby improving the efficiency in the light-load.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A DC/DC converter comprising:
an output circuit having a load;
a rectangular wave generator for converting an input voltage into driving pulses;
a resonant tank for providing a first voltage based on the driving pulses for the output circuit;
a detection unit for detecting a signal related to a state of the load; and
a control unit for controlling the rectangular wave generator in a hiccup mode to reduce a ratio of a current work period to a stop period when the state of the load is a light-load or a no-load,
wherein the ratio of a current work period to a stop period in the light-load or the no-load is smaller than a ratio of a current work period to a stop period when the duty ratio is 50% in the light-load or the no-load wherein a working frequency of the driving pulses is higher than a resonance frequency of the resonance tank, and the duty ratio of the driving pulses is within a predetermined range, so that a voltage gain of the DC/DC converter is higher than another voltage gain under the condition of 50% duty ratio.

2. The DC/DC converter of claim 1, wherein when the state of the load is the light-load or the no-load, the control unit changes the duty ratio of the driving pulses during the current work period, and then during the stop period the control unit calculates the number of the driving pulses within the current work period and adjusts the duty ratio of the driving pulses according to the number of the driving pulses.

3. The DC/DC converter of claim 2, wherein when the state of the load is the light-load or the no-load, the control unit decreases the duty ratio of the driving pulses during the current work period; when during the stop period the control unit determines that the number of the driving pulses within the current work period is less than or equal to the number of the driving pulses within a previous work period, the control unit keeps on decreasing the duty ratio of the driving pulses during a following work period.

4. The DC/DC converter of claim 2, wherein when the state of the load is the light-load or the no-load, the control unit decreases the duty ratio of the driving pulses during the current work period; when during the stop period the control unit determines that the number of the driving pulses within the current work period is more than the number of the driving pulses within a previous work period, the control unit increases the duty ratio of the driving pulses during a following work period.

5. The DC/DC converter of claim 4, wherein after increasing the duty ratio of the driving pulses, when the control unit determines that the number of the driving pulses within the following work period is less than or equal to the number of the driving pulses within the current work period, the control unit keeps on increasing the duty ratio of the driving pulses during a yet following work period.

6. The DC/DC converter of claim 4, wherein after increasing the duty ratio of the driving pulses, when the control unit determines that the number of the driving pulses within the following work period is more than the number of the driving pulses within the current work period, the control unit decreases the duty ratio of the driving pulses during a yet following work period.

7. The DC/DC converter of claim 2, wherein when the state of the load is the light-load or the no-load, the control unit increases the duty ratio of the driving pulses during the current work period; when during the stop period the control unit determines that the number of the driving pulses within the current work period is less than or equal to the number of the driving pulses within a previous work period, the control unit keeps on increasing the duty ratio of the driving pulses during a following work period.

8. The DC/DC converter of claim 2, wherein when the state of the load is the light-load or the no-load, the control unit increases the duty ratio of the driving pulses during the current work period; when during the stop period the control unit determines that the number of the driving pulses within the current work period is more than the number of the driving pulses within a previous work period, the control unit decreases the duty ratio of the driving pulses during a following work period.

9. The DC/DC converter of claim 8, wherein after decreasing the duty ratio of the driving pulses, when the control unit determines that the number of the driving pulses within the following work period is less than or equal to the number of the driving pulses within the current work period, the control unit keeps on decreasing the duty ratio of the driving pulses during a yet following work period.

10. The DC/DC converter of claim 8, wherein after decreasing the duty ratio of the driving pulses, when the control unit determines that the number of the driving pulses within the following work period is more than the number of the driving pulses within the current work period, the control unit increases the duty ratio of the driving pulses during a yet following work period.

11. The DC/DC converter of claim 1, wherein when the state of the load is a heavy-load or a full-load, the control unit controls the rectangular wave generator in a frequency modulation mode.

12. The DC/DC converter of claim 1, wherein the rectangular wave generator comprises a switch, and the control unit controls an on/off state of the switch to output the driving pulses, wherein amplitude of the driving pulses is equal to the input voltage or the double of the input voltage.

13. The DC/DC converter of claim 12, wherein the switch is a half-bridge circuit or a full-bridge circuit.

14. The DC/DC converter of claim 1, wherein the load comprises a resistor.

15. The DC/DC converter of claim 14, wherein the output circuit further comprises a transformer and a rectifier both electrically connected to the resistor.

16. The DC/DC converter of claim 1, wherein the resonant tank is a serial resonant circuit or a parallel resonant circuit.

17. The DC/DC converter of claim 16, wherein the serial resonant circuit is a LC series resonant circuit or a LLC series resonant circuit.

18. The DC/DC converter of claim 17, wherein the LLC series resonant circuit comprises a magnetizing inductor, a resonant inductor and a resonant capacitor connected to each other in series, wherein the magnetizing inductor and the output circuit are connected in parallel.

19. The DC/DC converter of claim 18, wherein the duty ratio is less than 50% and greater than a lower limit value of the predetermined range, so that when the resonant capacitor charges, the voltage gain of the DC/DC converter is greater than said another voltage gain under the condition of 50% duty ratio.

20. The DC/DC converter of claim 18, wherein the duty ratio is greater than 50% and less than an upper limit value of the predetermined range, so that when the resonant capacitor discharges, the voltage gain of the DC/DC converter is greater than said another voltage gain under the condition of 50% duty ratio.

21. A power converter comprising:
the DC/DC converter of claim 1;
a power factor correction device electrically coupled with the DC/DC converter; and
an electromagnetic interference filter electrically coupled with the power factor correction device for receiving alternating current, wherein the electromagnetic interference filter and the power factor correction device convert the alternating current into the input voltage and provide the input voltage for the DC/DC converter.

22. The power converter of claim 21, wherein when the state of the load is the light-load or the no-load, the power factor correction device reduces the input voltage provided for the DC/DC converter.

23. The power converter of claim 21, wherein when the state of the load is the light-load or the no-load, the power factor correction device is turned off.

24. The power converter of claim 21, wherein the power factor correction device comprises:
a bridge rectifier; and
a power factor corrector electrically coupled with the bridge rectifier.

25. The power converter of claim 21, wherein the power factor correction device comprises a bridgeless power factor corrector.

26. A method of controlling a power converter, the method comprising:
(a) converting an input voltage into driving pulses;
(b) providing a first voltage based on the driving pulses for an output circuit;
(c) detecting a signal related to a state of a load; and
(d) controlling the driving pulses in a hiccup mode to reduce a ratio of a current work period to a stop period when the state of the load is a light-load or a no-load; when the state of the load is the light-load or the no-load, controlling the driving pulses in the hiccup mode, wherein the ratio of a current work period to a stop period in the light-load or the no-load is smaller than a ratio of a current work period to a stop period when the duty ratio is 50% in the light-load or the no-load wherein step (d) comprises: when the state of the load is the light-load or the no-load, changing a duty ratio of the driving pulses during the current work period; then, during the stop period calculating the number of the driving pulses within the current work period, and adjusting the duty ratio of the driving pulses according to the number of the driving pulses.

27. The method of claim 26, wherein the step (d) further comprises:
when the state of the load is the light-load or the no-load, decreasing the duty ratio of the driving pulses during the current work period; and
when during the stop period it is determined that the number of the driving pulses within the current work period is less than or equal to the number of the driving pulses within a previous work period, keeping on decreasing the duty ratio of the driving pulses during a following work period.

28. The method of claim 26, wherein the step (d) further comprises:
when the state of the load is the light-load or the no-load, decreasing the duty ratio of the driving pulses during the current work period;
when during the stop period it is determined that the number of the driving pulses within the current work period is more than the number of the driving pulses within a previous work period, increasing the duty ratio of the driving pulses during a following work period.

29. The method of claim 28, wherein the step (d) further comprises:
after increasing the duty ratio of the driving pulses, when it is determined that the number of the driving pulses within the following work period is less than or equal to the number of the driving pulses within the current work period, keeping on increasing the duty ratio of the driving pulses during a yet following work period.

30. The method of claim 28, wherein the step (d) further comprises:
after increasing the duty ratio of the driving pulses, when it is determined that the number of the driving pulses within the following work period is more than the number of the driving pulses within the current work period, decreasing the duty ratio of the driving pulses during a yet following work period.

31. The method of claim 26, wherein the step (d) further comprises:
when the state of the load is the light-load or the no-load, increasing the duty ratio of the driving pulses during the current work period; and
when during the stop period it is determined that the number of the driving pulses within the current work period is less than or equal to the number of the driving pulses within a previous work period, keeping on increasing the duty ratio of the driving pulses during a following work period.

32. The method of claim 26, wherein the step (d) further comprises:
when the state of the load is the light-load or the no-load, increasing the duty ratio of the driving pulses during the current work period; and
when during the stop period it is determined that the number of the driving pulses within the current work period is more than the number of the driving pulses within a previous work period, decreasing the duty ratio of the driving pulses during a following work period.

33. The method of claim 32, wherein the step (d) further comprises:
after decreasing the duty ratio of the driving pulses, when it is determined that the number of the driving pulses within the following work period is less than or equal to the number of the driving pulses within the current work period, keeping on decreasing the duty ratio of the driving pulses during a yet following work period.

34. The method of claim 32, wherein the step (d) further comprises:
after decreasing the duty ratio of the driving pulses, when it is determined that the number of the driving pulses within the following work period is more than the number of the driving pulses within the current work period, increasing the duty ratio of the driving pulses during a yet following work period.

35. The method of claim 26, further comprising:
when the state of the load is a heavy-load or a full-load, controlling a rectangular wave generator in a frequency modulation mode.

36. The method of claim 26, wherein the step (a) further comprises:

controlling an on/off state of a switch to output the driving pulses, wherein amplitude of the driving pulses is equal to the input voltage or the double of the input voltage.

37. The method of claim 26, further comprising:
configuring an electromagnetic interference filter to receive alternating current, the electromagnetic interference filter and a power factor correction device for converting the alternating current into the input voltage and providing the input voltage.

38. The method of claim 37, further comprising:
when the state of the load is the light-load or the no-load, reducing the input voltage provided from the power factor correction device.

39. The method of claim 37, further comprising:
when the state of the load is the light-load or the no-load, turning off the power factor correction device.

* * * * *